Oct. 28, 1941.        H. H. HOLLY        2,260,780
PATTY MAKER
Filed Jan. 29, 1940        2 Sheets-Sheet 1
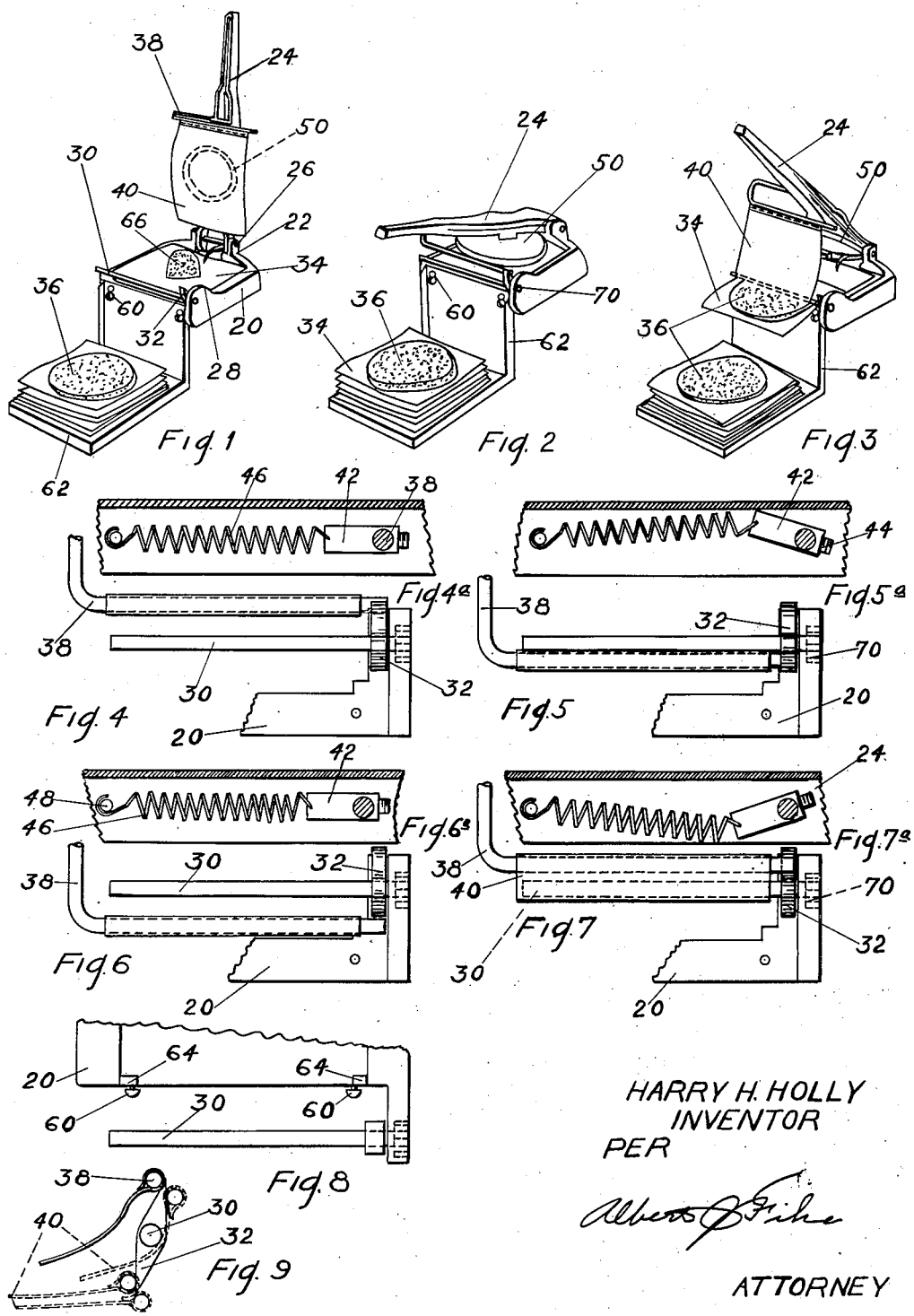
HARRY H. HOLLY
INVENTOR
PER
ATTORNEY

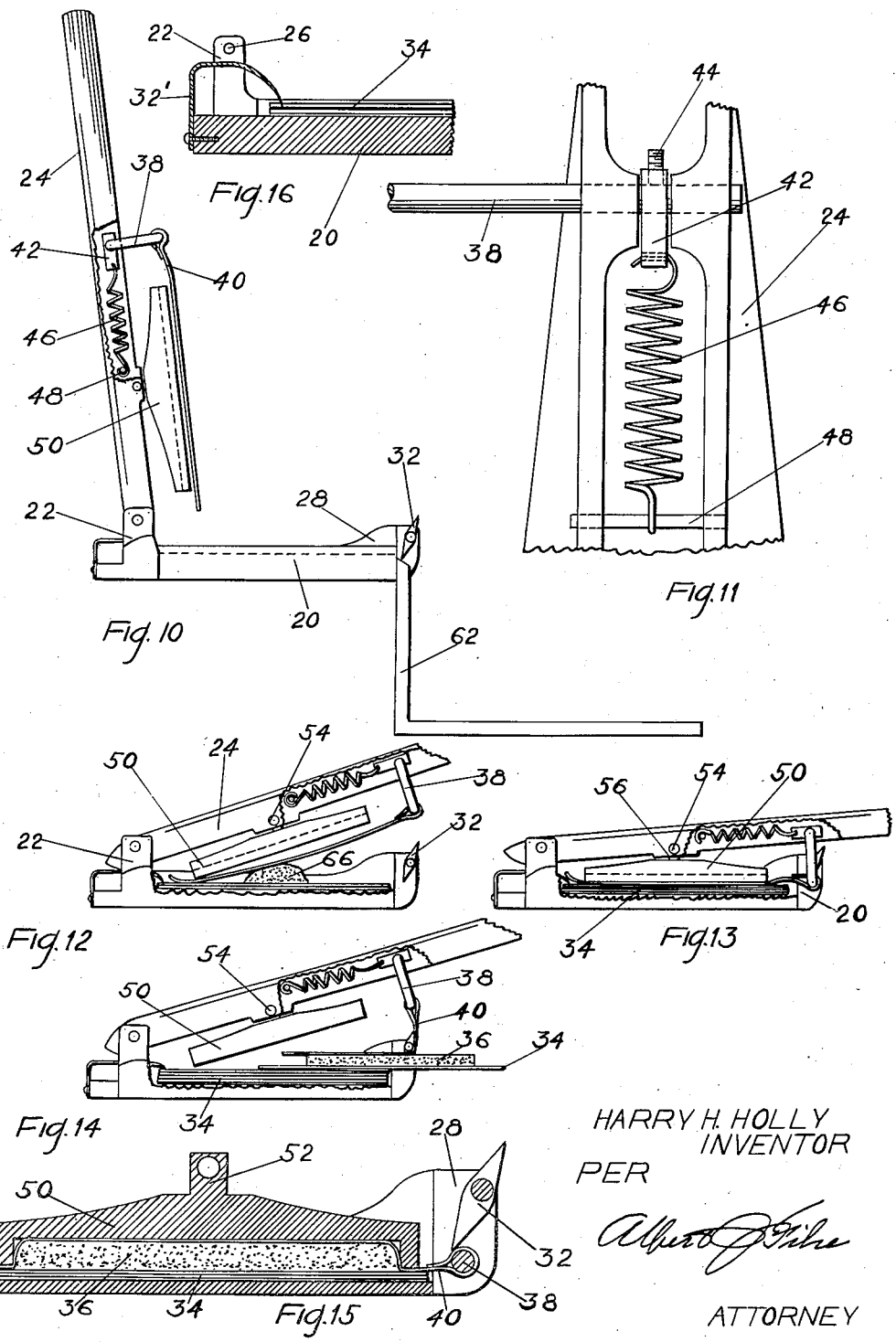

Patented Oct. 28, 1941

2,260,780

UNITED STATES PATENT OFFICE 2,260,780

PATTY MAKER

Harry H. Holly, Chicago, Ill., assignor to Holly Molding Devices, a partnership composed of Harry H. Holly, Albert J. Fihe, Irene Jessen, Frank Manno, and Michael Salvato, all of Chicago, Ill.

Application January 29, 1940, Serial No. 316,144

17 Claims. (Cl. 107—15)

This invention relates to an improved patty maker, and the present application describes an improvement over my prior invention entitled "Molding devices," Patent No. 2,081,455, granted May 25, 1937, and my application for patent on "Patty molding machine," filed February 20, 1939, Serial No. 257,272, and issued December 10, 1940, as Patent No. 2,224,390.

One of the important objects of the present invention is to provide a patty maker which will mold previously measured portions of meat or the like into desired shapes, usually flat round patties for making the well-known "hamburger."

Another important object of the invention resides in the provision of a machine for making patties of meat or the like which will be more simple and more economical to manufacture than my previous molding machines while, at the same time, comprising one which is substantially as efficient.

An important object of the present invention is the provision of a patty maker wherein previously measured portions of meat or the like are molded to shape by the downward movement of an operating handle pivotally mounted on a base and wherein the upward movement of the handle results in an automatic discharge of a completed patty with a clean sheet of paper lining thereunder forwardly into a tray or other receptacle which may or may not form part of the machine.

A still further object of the invention resides in the production of a molding means for meats or any other plastic commodities which is composed of a minimum of moving parts, thereby being less likely to get out of order and is small and compact whereby the same is more acceptable to individuals or others using machines of the class described, particularly in places where available space is at a premium.

Other and further important objects of the invention will be apparent from the disclosures in the accompanying drawings and following specification.

The invention, in a preferred form, is shown in the drawings and hereinafter more fully described.

In the drawings:

Figure 1 is a perspective view of the improved patty maker of this invention, showing the same with its handle in raised position for the molding of a portion of meat or other plastic material placed thereon and also showing the automatic repeating mold liner in position in front of the mold head.

Figure 2 shows the machine of Figure 1 with the handle depressed and in the act of molding the portion of meat or the like.

Figure 3 illustrates the same machine in the third step of the operation, namely, the raising of the handle accompanied by the automatic ejection of the completed patty, this being accomplished by the pulling of the mold liner under and around the "stripper bar" which is fixed on the base of the machine near the front.

Figure 4 is a front view showing a portion of the base of the machine, the stripper bar for the mold liner fixed on the base, and the support for the mold liner moving down into operative relation with the stripper bar, these parts being substantially in the same relationship as indicated in Figure 2.

Figure 4a is a view of the spring and lug which are inside the operating handle and which act to properly position the U-shaped mold liner support. This particular figure shows the relationship of the spring, the lug and a cross-section of the U-shaped liner supporting bar at the time when the liner supporting bar is in the position shown in Figure 4.

Figure 5 is a view similar to Figure 4, but showing the liner supporting bar moving down into a position still behind but below the stripper bar.

Figure 5a illustrates the position of the fixing lug for the mold liner support and its attached spring when the mold liner support is in the position shown in Figure 5.

Figure 6 shows the mold liner supporting bar just clearing the lowermost edge of the cam fixedly mounted on the stripper bar and now in a position to come up in front of the said cam and stripper bar.

Figure 6a illustrates the relationship of the spring and lug for the mold liner support at this juncture.

Figure 7 shows the mold lining bar with the mold liner moving up in front of the cam and the stripper bar, the mold liner being under the stripper bar.

Figure 7a shows the spring and mold lining bar lug in the particular position assumed at this stage of the relative movement of these parts.

Figure 8 is a top plan view of the front portion of the base of the machine showing the extension which holds the stripper bar in position.

Figure 9 is a view of the cam fixed at the inner end of the stripper bar and showing the end of the mold lining bar in four positions with respect to this cam, the four positions being those illustrated in Figures 4 to 7 inclusive respectively.

Figure 10 is a side elevation of the entire machine with the handle, mold head, mold liner, receiving tray and all associated parts in operative position. A part of the handle is broken away to show the relationship of the spring and lug which position and govern the action of the mold lining support.

Figure 11 is an enlarged view, illustrating the spring and lug for the mold lining support and showing the relationship of these parts with respect to the handle.

Figure 12 is a detail view, parts being broken away, showing the mold head of the machine being brought down by the handle into position to shape a portion of meat or the like, the position of the parts in this figure being approximately the same as that shown in Figure 2.

Figure 13 is a view, similar to Figure 12, showing the mold head and handle after the patty has been formed and with the parts in their lowermost position.

Figure 14 illustrates the handle, mold head and mold liner at the beginning of the upward stroke with the completed patty and one supporting sheet of paper being ejected from the machine. The parts here are in approximately the same relationship as illustrated in Figure 3.

Figure 15 is an enlarged sectional view, illustrating the mold head in its lowermost position such as shown in Figure 13 with the completed patty under the mold and with the mold liner support ready to move upwardly in front of the control cam.

Figure 16 is a sectional detail of the rear portion of the base of the machine, showing a plurality of sheets of patty lining paper therein and the releasable sharpened clamp therefor.

As shown in the drawings:

The reference numeral 20 indicates generally the base of the improved patty maker of this invention, the same being preferably a metal casting or the like having upstanding lugs 22 at the rear to which are fastened a handle 24 by means of a pivot pin or the like 26.

At the forward right-hand side of the base is an integral upwardly extending projection 28 having a transverse opening therethrough, and in this opening is fitted a bar 30 which shall hereafter be referred to as a "stripper bar." Mounted on the stripper bar 30 at its inner end and adjacent the upstanding lug 28 is a cam element 32, the shape of which is best shown in Figures 9 and 15.

The base 20 is recessed with upstanding edges at its two sides and across the rear as best shown in Figures 1 to 3, 10 to 14 inclusive, and Figure 16, and in this recess is adapted to be positioned a number of sheets of paper of the correct size and preferably waxed paper such as is ordinarily used for the supporting and handling of such patties.

In order to retain this quantity of sheets in the base while, at the same time, allowing of the ready immediate removal of a single sheet with each completed patty, a spring clamp 32' (Figure 16) is mounted on the rear face of the base and projects inwardly between the lugs and positioned to hold the sheets of paper 34 in desired relationship with regard to the base while, at the same time, the sharpened point of this spring clamp 32 readily permits the forward withdrawal of a single sheet at each operation of the handle and mold head and the completion of a patty 36. Pivotally mounted in the handle 24 at approximately its middle is a U-shaped bar 38 (Figures 10 and 11) which acts to support the mold lining sheet 40. One end of this U-shaped bar 38 is fitted into openings in the handle which is channeled at this point, and fixed to that portion of the bar which is inside the handle is a lug 42, the lug having an opening therein through which the bar 38 passes, the relationship of the lug and bar being first adjusted and then fixed by means of a set screw 44. The other end of the lug 42 has an opening therein into which is fitted one end of a helical spring 46, the spring being under some tension and with its other end fastened to a cross pin 48 and also mounted in the channel portion of the handle. This construction allows of a limited free movement of the U-shaped mold liner supporting bar with regard to the handle, and the adjustment of the lug 42 in the spring 46 with regard to the inner end of the bar 38 is such that when the handle 24 is moved downwardly as shown in Figure 12, the outer end of the bar 38 will strike the rear face of the cam 32 (Figures 4, 9 and 12) and thence ride downwardly behind the cam to the second position shown in the dotted lines in Figure 9 and also full lines in Figure 5. The mold lining sheet 40, being mounted on the bar 38, moves downwardly with it, and the mold head 50 itself, being always just behind the mold lining sheet, as it is likewise mounted on the handle 24.

As best shown in Figure 15, the mold head 50 is hollow for the reception and proper molding of the patty 36 and has an integral upstanding lug 52 with an opening therein, the attachment between the mold head and the handle being by means of a pivot pin 54 passing through the two sides of the channeled handle and the upstanding lug 52 of the mold head 50. An integral projection 56 is formed on the handle adjacent the point where the mold head is attached (Figure 13), thereby allowing a limited pivotal movement of the mold head when the handle is raised and depressed. This compensates for operating thickness of the pile of paper sheets 34 in the base of the machine 20. Obviously, the mold heads may be of different sizes and shapes to make various patties.

A pair of screws or rivets 60 is mounted in the front face of the base 20 of the machine, and a tray 62 of the shape and dimensions indicated in Figures 1, 2, 3 and 10 is removably mounted on these elements 60 by means of bayonet slots or the like in the adjacent portions of the tray so that the tray can be readily removed when the device is not in use. This constitutes a saving of space.

As an alternative to the pointed spring clip 32' for holding the papers 34 in position, a pair of integral lugs 64 may be provided in the base 20 of the machine as best shown in Figure 8, these extending upwardly for a sufficient distance to catch and retain a plurality of paper sheets when the same are placed in the base while, at the same time, allowing a single sheet to be pulled out over the upper ends thereof and between the same when a completed patty is withdrawn from the machine as illustrated in Figure 14.

In operation, a previously weighed or measured portion of meat or some other material to be molded is placed on the topmost sheet of paper 34 as indicated at 66 in Figure 1, the handle 24 is then brought down smartly, compressing and molding the portion of plastic material 66, this molding effect taking place between the uppermost sheet of paper 34 and the underface of the mold lining sheet 40 as best shown in Figure 15. On the downward motion, the support for the mold liner retains the mold liner in position in front of the mold as shown in Figures 10 and 12, the mold liner itself being constrained against the face of the mold 50 by reason of air resistance.

It will be noted that the mold liner sheet 40 is of a width slightly less than the corresponding length of its U-shaped supporting rod 38 so that a free end of the rod projects at the right-hand side of the machine and in position to engage the upper rear face of the cam 32 when the handle is moved in the position shown in Figure 2. The inner end of the mold lining supporting bar 38 is then just contacting the upper rear face of the cam 32 as shown in Figure 4, and in full lines, in Figure 9. Subsequent positions of the mold liner supporting bar 38 with respect to the cam 32 and also with respect to the stripper bar 39 are shown in Figures 4 to 7 inclusive and also in dotted lines in Figure 9. It will be evident that the mold lining sheet 40 will be constrained by this action of its supporting bar 38 to move beneath and around the stripper bar 39 on the upward movement of the handle 24, this action being best shown in Figures 3 and 14 whereupon the completed patty 36 with one supporting sheet of paper 34 adhering thereto is pulled outwardly from the base of the machine and automatically ejected and deposited on the tray 62, all as best shown in Figures 1, 2 and 3. The operation is then repeated until the tray is full or until the desired number of patties have been molded. Obviously, the supply of paper sheets 34 must be replenished from time to time, but it will be evident that the mold lining sheet 40 is always available for succeeding operations, and in fact, will suffice for the completion of many hundreds or even thousands of patties. The base of the machine is preferably fastened onto a bench or table by means of screws or bolts passing through holes formed in the base or in some other convenient manner. The stripper bar 30 is held in position by means of a nut 70 which is preferably mounted in a countersunk opening in the integral extension 28 of the base 20.

It is obvious that herein is provided a simple yet efficient and compact patty maker which will satisfactorily meet the requirements of the ordinary small hamburger stand operator in that it will satisfactorily mold meat patties or the like while, at the same time, coming within an acceptable price range. Furthermore, the construction is rugged, the parts are few, and there are practically no moving elements, thereby eliminating to a great extent the necessity of repairs and also providing a device which will withstand considerable rough usage.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A patty maker, comprising a base, a handle pivotally mounted on the base, means for supporting a plurality of stacked paper sheets on the base for individual removal, a mold head loosely mounted on the handle in position to make overall contact with the diminishing stack of sheets upon each downward pivotal movement of the handle, a repeating mold liner for the mold head, and means for supporting the mold liner in position adjacent the mold head.

2. A patty maker, comprising a base, a handle pivotally mounted on the base, a mold head loosely pivoted on the handle in position to contact the base in parallel relationship upon downward movement of the handle, a repeating mold liner for the mold head, means for supporting the mold liner in position adjacent the mold head, and cooperating stop means on the handle and mold head for limiting the pivotal movement of the mold head with respect to the handle.

3. A patty maker, comprising a base, a handle pivotally mounted on the base, a mold head loosely mounted on the handle in position to contact the base upon downward movement of the handle, a repeating mold liner for the mold head, and means for supporting the mold liner in position adjacent the mold head, said means comprising a U-shaped bar, one leg of the bar supporting the mold liner and the other leg of the bar pivotally mounted in the handle.

4. A patty maker, comprising a base, a handle pivotally mounted on the base, a mold head loosely mounted on the handle in position to contact the base upon downward movement of the handle, a repeating mold liner for the mold head, means for supporting the mold liner in position adjacent the mold head, said means comprising a U-shaped bar, one leg of the bar supporting the mold liner and the other leg of the bar pivotally mounted in the handle, a lug fixed on that portion of the bar inside the handle, and a spring for resiliently maintaining the lug in desired position.

5. A patty maker, comprising a base, a channel-shaped handle pivotally mounted on the base, a mold head loosely mounted in the channel of the handle in position to contact the base upon downward movement of the handle, a repeating mold liner for the mold head, means for supporting the mold liner in position adjacent the mold head, said means comprising a U-shaped bar, one leg of the bar supporting the mold liner and the other leg of the bar pivotally mounted in the handle, a lug fixed on that portion of the bar inside the channel of the handle, and a spring also in the channel for resiliently maintaining the lug in desired position for a flexed shifting movement.

6. A patty maker, comprising a base, a handle pivotally mounted on the base, a mold head loosely mounted on the handle in position to contact the base upon downward movement of the handle, a repeating mold liner on the mold head, means for supporting the mold liner in position adjacent the mold head, said means comprising a U-shaped bar, one leg of the bar supporting the mold liner and the other leg of the bar pivotally mounted in the handle, a lug fixed on that portion of the bar inside the handle, a spring for resiliently maintaining the lug in desired position for a flexed shifting movement, and a cam on the base for cooperation with the free end of the mold liner supporting bar.

7. A patty maker, comprising a base, a handle pivotally mounted on the base, a mold head loosely mounted on the handle in position to contact the base upon downward movement of the handle, a repeating mold liner on the mold head, means for supporting the mold liner in position adjacent the mold head, said means comprising a U-shaped bar, one leg of the bar supporting the mold liner and the other leg of the bar pivotally mounted in the handle, a spring for resiliently maintaining the lug in desired position for a flexed shifting movement, a cam on the base for cooperation with the free end of the mold liner supporting bar, and a stripper bar associated with the cam for cooperation with the mold liner.

8. A patty maker, comprising a base, a handle pivotally mounted on the base, a mold head loosely mounted on the handle in position to contact the base upon downward movement of the handle, a repeating mold liner adjacent the mold head, means for supporting the mold liner in position adjacent the mold head, said means comprising a U-shaped bar, one leg of the bar supporting the mold liner and the other leg of the bar pivotally mounted in the handle, a spring for resiliently maintaining the liner-supporting leg in desired position for a flexed shifting movement, a cam on the base for cooperation with the free end of the mold liner supporting bar, a stripper bar associated with the cam for cooperation with the mold liner, the stripper bar extending transversely across the front of the base cam adapted to guide the mold liner support behind it and the stripper bar on a downward motion of the handle, mold and mold liner and to allow the mold liner to shift beneath the stripper bar.

9. A patty maker, comprising a base, a handle pivotally mounted on the base, a mold head loosely mounted on the handle in position to contact the base upon downward movement of the handle, a repeating mold liner on the mold head, means for supporting the mold liner in position adjacent the mold head, said means comprising a U-shaped bar, one leg of the bar supporting the mold liner and the other leg of the bar pivotally mounted in the handle transversely thereof, a spring for resiliently maintaining the liner-supporting leg in desired position for a flexed shifting movement, a cam on the base for cooperation with the free end of said leg, a stripper bar associated with the cam for cooperation with the mold liner, the stripper bar extending across the front of the base, and the liner-supporting leg being in parallel relationship therewith in all operating positions, the cam adapted to guide the mold liner support behind it and the stripper bar on a downward motion of the handle, mold and mold liner and to allow the mold liner to shift beneath the stripper bar for an upward outward pulling movement upon an upward movement of the handle and its appurtenances.

10. A patty maker, comprising a recessed base, means for retaining a plurality of patty supporting sheets in the base, a handle pivotally mounted on the base, a mold head on the handle, a repeating liner sheet for the mold, means for supporting the liner sheet adjacent the mold for a shifting action relative thereto, and a bar fixed across the front of the base of the machine for cooperation with the mold liner sheet.

11. A patty maker, comprising a recessed base, means for retaining a plurality of patty supporting sheets in the base, a handle pivotally mounted on the base, a mold head on the handle, a repeating liner sheet for the mold, means for supporting the liner sheet adjacent the mold for a shifting action relative thereto, a bar fixed across the front of the base of the machine for cooperation with the mold liner sheet, and a cam at one end of the bar for cooperation with the mold liner support.

12. A patty maker, comprising a recessed base, means for retaining a plurality of patty supporting sheets in the base, a handle pivotally mounted on the base, a mold head on the handle, a repeating liner sheet for the mold, means for supporting the liner sheet adjacent the mold for a shifting action relative thereto, a bar fixed across the front of the base of the machine for cooperation with the mold liner sheet, and a cam mounted on one end of the bar for cooperation with the mold liner support, said mold liner support comprising a bar extending transversely across the machine adjacent the forward end of the mold head, and means for fixing the bar in a pivoting relationship with regard to the handle.

13. A patty maker, comprising a recessed base, means for retaining a plurality of patty supporting sheets in the base, a handle pivotally mounted on the base, a mold head on the handle, a repeating liner sheet for the mold, means for supporting the liner sheet adjacent the mold for a shifting action relative thereto, a bar fixed across the front of the base of the machine for cooperation with the mold liner sheet, and a cam mounted on one end of the bar for cooperation with the mold liner support, said mold liner support comprising a bar extending transversely across the machine adjacent the forward end of the mold head, and means for fixing the bar in a pivoting relationship with regard to the handle, said last-named means further including a spring for guiding the action of the free end of the bar about the aforesaid cam.

14. A patty maker, comprising a base, an integral extension on one side thereof, ridges on three sides of the base, leaving an open front, means for detachably holding a plurality of patty supporting sheets on the base, a stripper bar extending across the open front of the base, a handle pivoted at the rear of the base, a mold head on the handle for arcuate movement to and from the base, and a repeating mold liner for the mold head.

15. A patty maker, comprising a base, an integral extension on one side thereof, ridges on three sides of the base, leaving an open front, means for detachably holding a plurality of patty supporting sheets on the base, a stripper bar extending across the open front of the base, a handle pivoted at the rear of the base, a mold head on the handle for arcuate movement to and from the base, a repeating mold liner for the mold head, and a spring-held slightly shiftable support for the mold liner.

16. A patty maker, comprising a base, an integral extension on one side thereof, ridges on three sides of the base, leaving an open front, means for detachably holding a plurality of patty supporting sheets on the base, a stripper bar extending across the open front of the base, a handle pivoted at the rear of the base, a mold head on the handle for arcuate movement to and from the base, a repeating mold liner for the mold head, and a spring-held slightly shiftable support for the mold liner, said support being mounted in the handle beyond the mold head.

17. A patty maker, comprising a base, an integral extension on one side thereof, ridges on three sides of the base, leaving an open front, means for detachably holding a plurality of patty supporting sheets on the base, a stripper bar extending across the open front of the base, a handle pivoted at the rear of the base, a repeating mold liner for the mold head, a spring-held slightly shiftable support for the mold liner, said support being mounted in the handle beyond the mold head, and a cam associated with the stripper bar for controlling the movements of the spring-held mold liner support.

HARRY H. HOLLY.